United States Patent
Ojima

[11] Patent Number: 5,246,404
[45] Date of Patent: Sep. 21, 1993

[54] UNIT TENSIONER

[75] Inventor: Juji Ojima, Kanagawa, Japan

[73] Assignee: NHK Spring Company Limited, Yokohama, Japan

[21] Appl. No.: 719,303

[22] Filed: Jun. 25, 1991

Related U.S. Application Data

[63] Continuation-in-part of Ser. No. 512,443, Apr. 23, 1990, abandoned.

[30] Foreign Application Priority Data

Apr. 28, 1989 [JP] Japan .................................. 1-109668
Jul. 27, 1989 [JP] Japan .................................... 1-94863

[51] Int. Cl.⁵ ............................................. F16H 7/08
[52] U.S. Cl. ................................... 474/111; 474/140
[58] Field of Search ................ 474/101, 111, 133–135, 474/137, 140, 138

[56] References Cited

U.S. PATENT DOCUMENTS

| | | | |
|---|---|---|---|
| 3,964,331 | 6/1976 | Oldfield . | |
| 4,371,360 | 2/1983 | Ojima et al. | 474/111 |
| 4,425,104 | 1/1984 | Ojima | 474/111 |
| 4,466,802 | 8/1984 | Ojima et al. | 474/138 |
| 4,472,161 | 9/1984 | Ojima | 474/111 |
| 4,702,726 | 10/1987 | Ojima et al. | 474/101 |
| 4,722,720 | 2/1988 | Ojima et al. | 474/101 |
| 4,743,224 | 5/1988 | Yoshikawa et al. | 474/101 |
| 4,826,468 | 5/1989 | Friedrichs | 474/101 |
| 4,902,266 | 2/1990 | Ojima et al. | 474/111 |
| 4,934,984 | 6/1990 | Ojima | 474/111 |

FOREIGN PATENT DOCUMENTS 15773 2/1970 Japan .
742092 12/1955 United Kingdom .

Primary Examiner—Ramon S. Britts
Assistant Examiner—Roger J. Schoeppel
Attorney, Agent, or Firm—Keck, Mahin & Cate

[57] ABSTRACT

A unit tensioner for a chain or belt comprising a tensioning unit mounted on a base plate and an arched, sliding shoe pivotally mounted on a pin fixed to the base plate so that a cap portion of a tension rod, extending from the tensioning unit, abuts the inner arch surface of the shoe to pivot the shoe so that the chain or belt slides against the outer arched surface of the shoe to tighten the chain or belt and to prevent wear of the cap portion or wear of the mating chain or belt.

3 Claims, 7 Drawing Sheets

UNIT TENSIONER

This application is a continuation-in-part of co-pending application Ser. No. 07/512,443 titled "Tensioner" filed Apr. 23, 1990 incorporated herein by reference now abandoned.

BACKGROUND OF THE INVENTION

The present invention relates to a tensioner for applying constant tension to a chain or belt driving the camshaft of an automotive engine.

When a conventional tensioner is used to apply constant tension on a chain or belt, the conventional tensioner must be used together with an idling pulley or a sliding shoe. The conventional tensioner comprises a rotatable cylinder energized by a torsion spring, and a tension rod engaged by threads with the rotatable cylinder and urged in the axial direction by converting the rotating force of the rotatable cylinder into an axial, urging force of the tension rod. These components are mounted in a bored portion of the casing of the tensioner. A non-circular portion of the tension rod engages a non-circular slideway in a bearing, fixed in the casing bore, to restrain the rotation of the tension rod and to support the tension rod and rotatable cylinder. The tension rod is urged to move axially in the slideway by the threads of the rotatable cylinder to abut the belt or chain through an idling pulley or an arched, sliding shoe.

The reason the idling pulley or the sliding shoe is used between the belt or chain and the cap of the tension rod is that lateral pressure applied on the cap of the tension rod by the chain or belt in the running direction thereof functions to wear the tension rod and the belt or chain. Therefore, the idling pulley or the sliding shoe is mounted on the inner or outer wall of the engine so as to transmit an urging force of the tension rod to the belt or chain.

However, the idling pulley or sliding shoe must be mounted in a limited space such as an inner or outer wall of an engine block, and it is difficult to design adequate components; to mount and adjust them well; and to perform maintenance work on them.

SUMMARY OF THE INVENTION

The present invention provides a compact unit tensioner with sliding shoe already mounted thereon so as to dispense with auxiliary separate components, thus eliminating the above bothersome operations. The unit tensioner comprises a tensioning unit which converts a rotating force of a rotatable cylinder into an urging force of a tension rod supported by a non-circular slideway bearing, a support means integrally formed in a shoulder portion of a casing of the tensioning unit and an arched shoe, pivotally mounted on the support means, which moves abutting a cap of the tension rod for providing a constant tension in a belt or chain by installing only the unit tensioner on an engine block without requiring any other component.

DETAILED DESCRIPTION OF THE PREFERRED EMBODIMENTS

Figure 1:
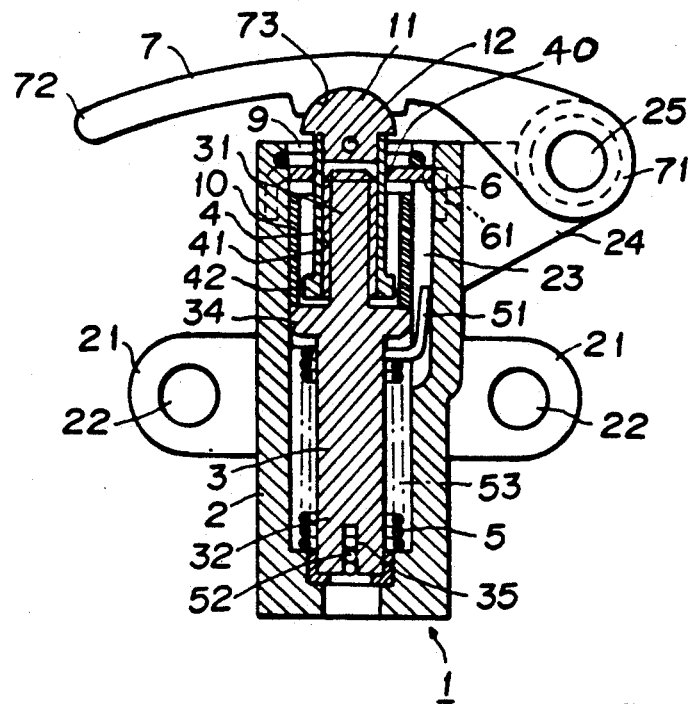
FIGS. 1, 2 and 3 respectively are a longitudinal sectional view, a plan view and a left side view of a first embodiment of the present invention.

Hereinafter, the present invention will be described referring to the drawings, wherein identical components are indicated with the same numbers and alphabetical suffixes.

Figure 2:
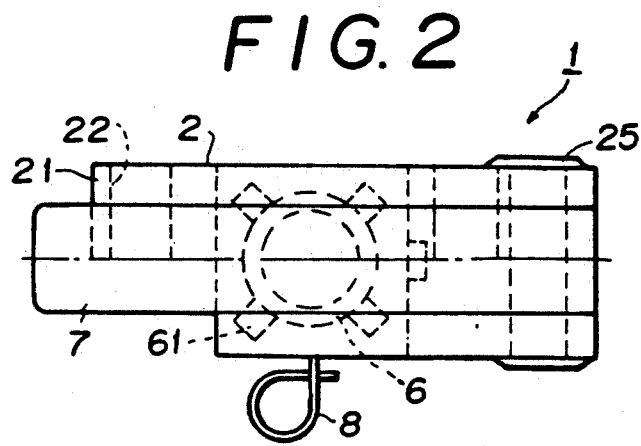
Figure 3:
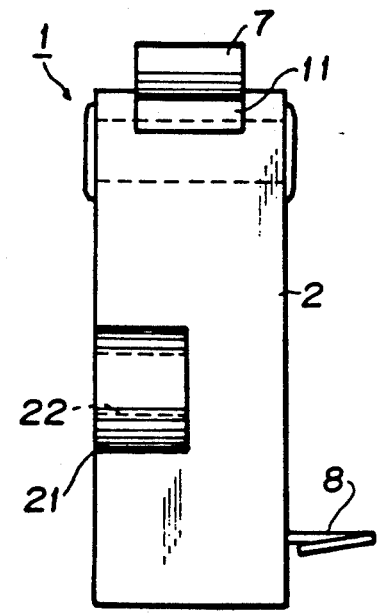

In FIGS. 1, 2 and 3, a first embodiment of a unit tensioner according to the present invention comprises:

a tensioning unit 1 which converts a rotating force of a rotatable cylinder 3 thereof due to a torsion spring 5 into an axially directed urging force of a tension rod 4 engaged therein and supported by a non-circular slideway of a bearing 6 of the tensioning unit;

a support means, including a base plate 24 integrally formed (incorporated) at a shoulder portion of a casing 2 of the tensioning unit; and a movable shoe 7 pivoted o the base plate 24 and abutting on a cap 11 of the tension rod 4. The unit tensioner does not need any other component for transmitting the urging force of the tension rod to a belt or chain.

The casing 2 of the tensioning unit 1 has a wing portion 21 provided with fixing holes 22, by which the unit tensioner is fastened on the inner wall or outer wall of the engine. A long groove 23 is provided in a bore portion of the casing, into which a hook portion 51 of the torsion spring 5 is inserted.

The rotatable cylinder 3 and tension rod 4 are engaged through threaded portions and are inserted in the bore portion of the casing 2. The rotatable cylinder 3 has a male threaded portion 31 and a flange portion 34. A slit 35 is provided on the rear end of the rotatable cylinder 3 into which another hook portion 52 of torsion spring is inserted. An initial torsional torque is applied by turning the slit 35 with a flat driver. A stopper pin 8 is inserted into the slit 35 through a through hole formed in the wall of the casing 2, by which the rotation of the rotatable cylinder 3 is locked during transport and storage.

The tension rod 4 is cylindrical with threaded portion 41 formed on the inner wall thereof engaged with the threaded portion 31 of the rotatable cylinder 3, and the outer surface of the rod is provided with a pair of parallel surfaces (not shown) which are inserted into the slideway 40 which is a non-circular hole in bearing 6 to permit axial movement and to prevent rotation of the tension rod.

The bearing 6 has a plurality of protrusions 61 fitted in the inner wall of the casing 2 to prevent rotation of the bearing so that the rotation of the tension rod is restrained. Therefore, the rotating force applied on the rotatable cylinder 3 by the torsion spring 5 is converted into an axial urging force of the tension rod 4. However, excessive axial motion of the tension rod 4 is restrained by a flange portion 42 thereof. A snap ring 9 fitted within an inner groove formed on the open end of the bore portion of casing 2 retains the tension rod 4. A collar 10 mounted between the bearing 6 and the flange portion 34 of the rotatable cylinder 3 restrains the axial play of the rotatable cylinder 3.

A pivot end 71 of the movable shoe 7 of arch form is pivoted to the shoulder portion of the support means 24 with a shaft 25 so that a cap seat 73 at the interior arched surface of shoe 7 abuts the cap 11. The shoe 7 is arched (gradually bent inward) so that its other end 72 is spaced apart from the belt or chain. The cap 11 is fixed on the tension rod 4 with a lock pin 12.

A return spring (not shown) is provided between the shaft 25 and the pivot end 71 so as to keep them in contact, but the compression force of the shoe onto the tensioner cap 11 must be less than the urging force of the tension rod 4.

Figure 4:
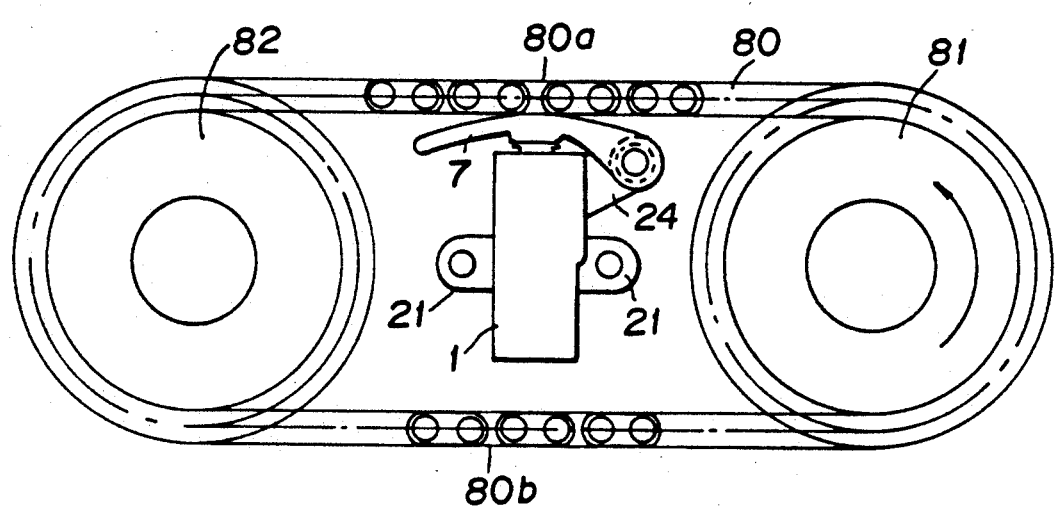
FIGS. 4 and 5 show how the first embodiment is used on a chain.
Figure 5:
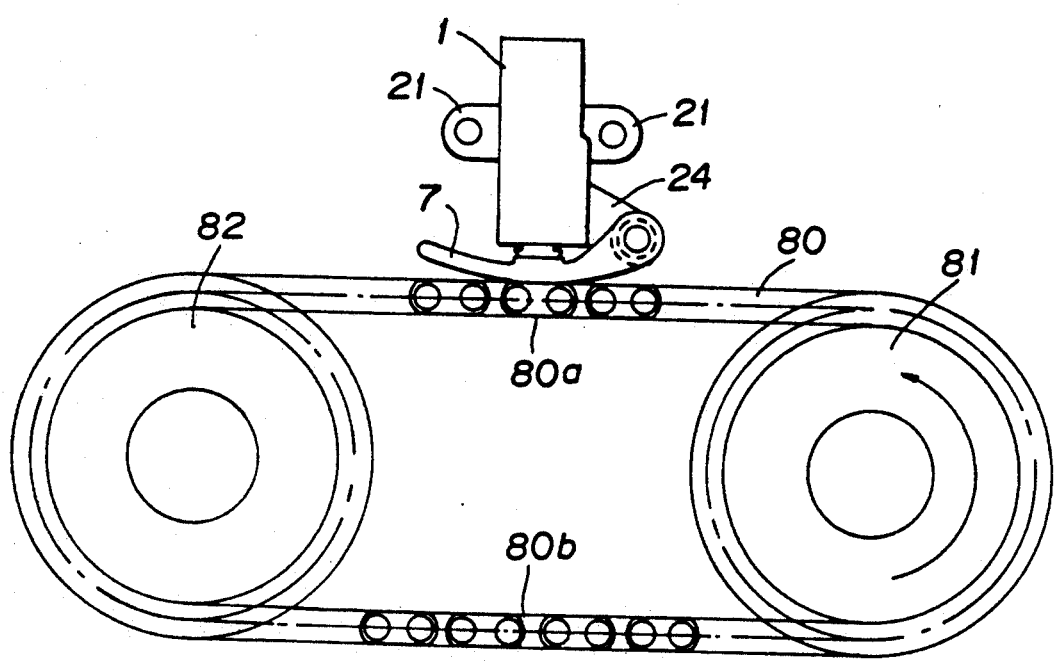

FIGS. 4 and 5 show the first embodiment used in a power transmitting system with a chain. A chain 80 is mounted on a driving sprocket 81 and a driven sprocket 82 and runs in the counter-clockwise direction. In this case, the chain is slack on a slack upper side 80a and tight on a tight lower side 80b. The outer arched surface of shoe 7 abuts the slack side 80a to tighten the chain. The unit tensioner may be used to tension the slack side 80a of the chain 80 from inside the chain as shown in FIG. 4 or from outside the chain as shown in FIG. 5. Since the unit tensioner comprises the tensioning unit 1, the movable shoe 7, and the support means 24, it is possible to protect the tension rod 4 and the cap 11 of the tension rod from wear by mounting only the unit tensioner to the engine, thus, dispensing with bothersome operations for locating and adjusting the position of a separate shoe. Accordingly, the unit tensioner contributes to a wide and free design of the engine.

Figure 6:
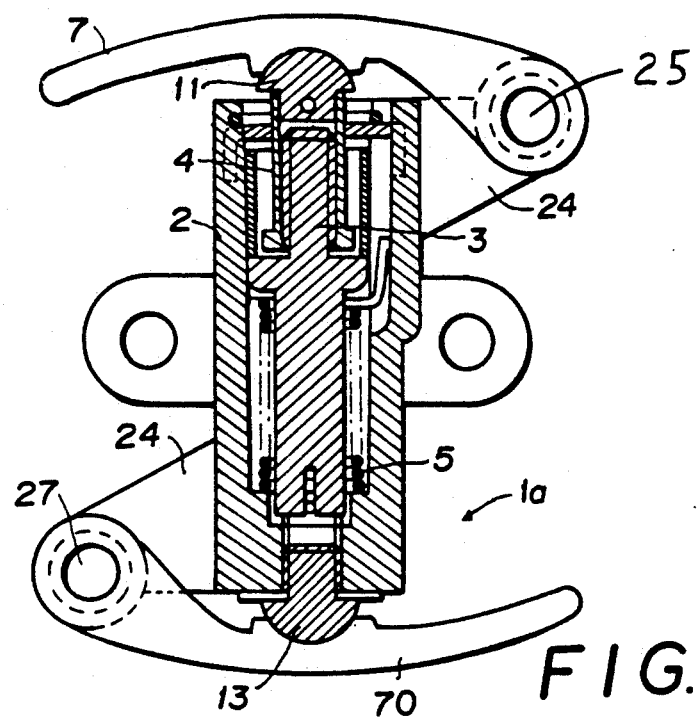
FIGS. 6, 7 and 8 respectively are a longitudinal sectional view, a plan view and a left side view of a second embodiment.
Figure 8:
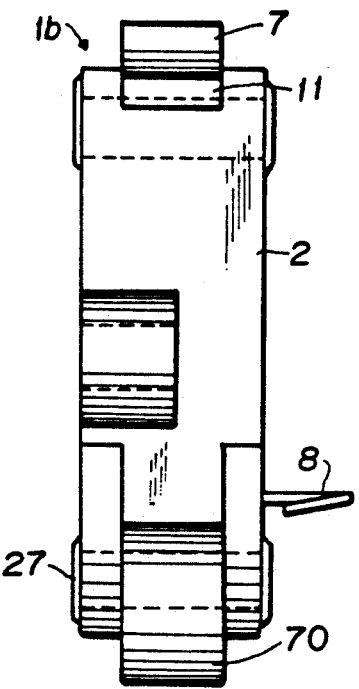
Figure 7:
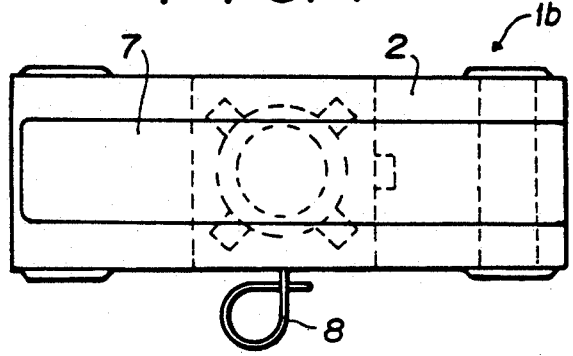

FIGS. 6, 7 and 8 show a second embodiment of the present invention. The unit tensioner comprises a tensioning unit 1a, a pair of support means, two base plates 24, a movable shoe 7 and a stationary shoe 70. The tensioning unit 1a has an upper cap 11 fixed on the protruding end of a tension rod 4 and a lower cap 13 screwed in the rear end of a casing 2. The movable shoe 7 is pivotally connected by a shaft 25 onto the shoulder portion of a base plate 24. The stationary shoe 70 is pivotally connected onto the skirt portion of another base plate 24 with a shaft 27, both in relation to the casing 2.

Figure 9:
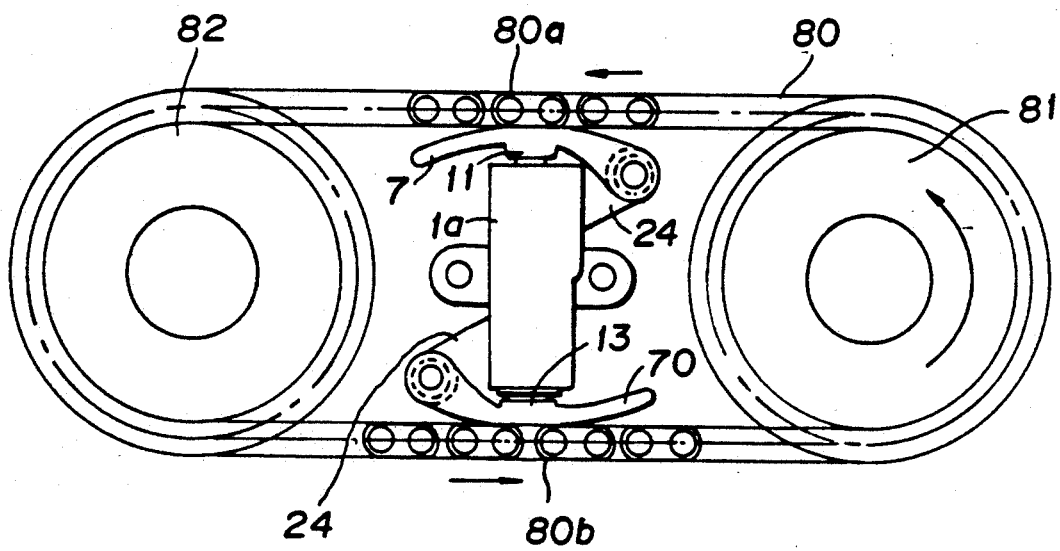
FIG. 9 shows how the second embodiment is used on a chain.

FIG. 9 shows the second embodiment in use. A chain 80 is mounted on a driving sprocket 81 and a driven sprocket 82. The chain turns in the direction indicated with an arrow. The unit tensioner is mounted inside the chain 80, between sides 80a and 80b, so that the moveable show 7 abuts the upper slack side 80a of chain 80, and the stationary shoe 70 abuts the lower tight side 80b of chain 80. Movable shoe 7 applies constant tension to the chain at 80a, and fixed shoe 70 stabilizes the chain at 80b to prevent vibrations. Since the unit tensioner comprises the movable shoe 7 and the stationary shoe 70, both the constant tension at 80a, and the stabilization at 80b are provided by mounting only the unit tensioner to the engine, thus dispensing with additional operations for mounting two shoes in position.

Figure 10:
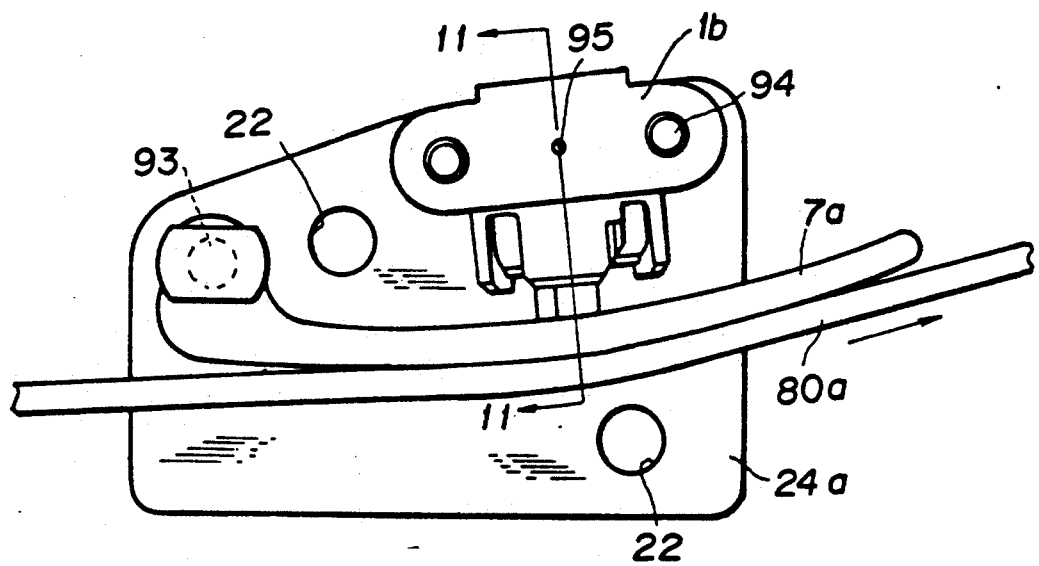
FIG. 10 shows how a third embodiment is used on a chain.
Figure 11:
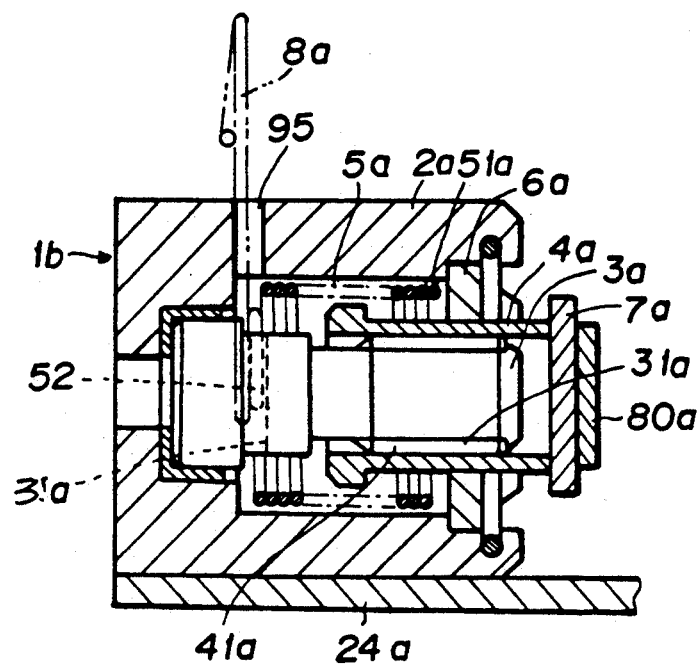
FIG. 11 is a sectional view along a line 11—11 of FIG. 10.

FIGS. 10 and 11 show a third embodiment according to the present invention comprising a tensioning unit 1b of three layered construction. The unit tensioner comprises a base plate 24a, to which the tensioning unit 1b is fixed, and a movable shoe 7a pivotally mounted on a shoulder portion of the base plate 24a in relation to the tensioning unit 1b of three layered construction shown in FIG. 11. The tensioning unit 1b comprises a rotatable cylinder 3a of which outer threaded portion 31a is engaged with an inner threaded portion 41a of a tension rod 4a and a torsion spring 5a mounted over the rotatable cylinder 3a and the tension rod 4a forming the three layered construction. The front end of the tension rod 4a is open and abuts on the movable shoe 7a. The outer surface of the tension rod 4a has a pair of parallel surfaces and is inserted in a non-circular hole of a bearing 6a. Thus, the rotational force of rotatable cylinder 3a energized by the torsion spring 5a is converted into an axial urging force of tension rod 4a. A stopper pin 8 is inserted into a groove 35 of the rotatable cylinder 3a through a through hole 95 formed in the casing 2a so as to lock the torsion spring 5a during transport and storage.

In this case, since the unit tensioner comprises a compact tensioning unit 1b of three layer construction and a large base plate 24a (support means) the movable shoe 7a may be arched long to prevent wear of the chain 80 and the movable shoe 7a. Constant tension is applied to slackened side 80a of the chain by mounting only the unit tensioner, thus dispensing with mounting and adjusting work required for a separate tensioner and movable shoe.

Figure 12:
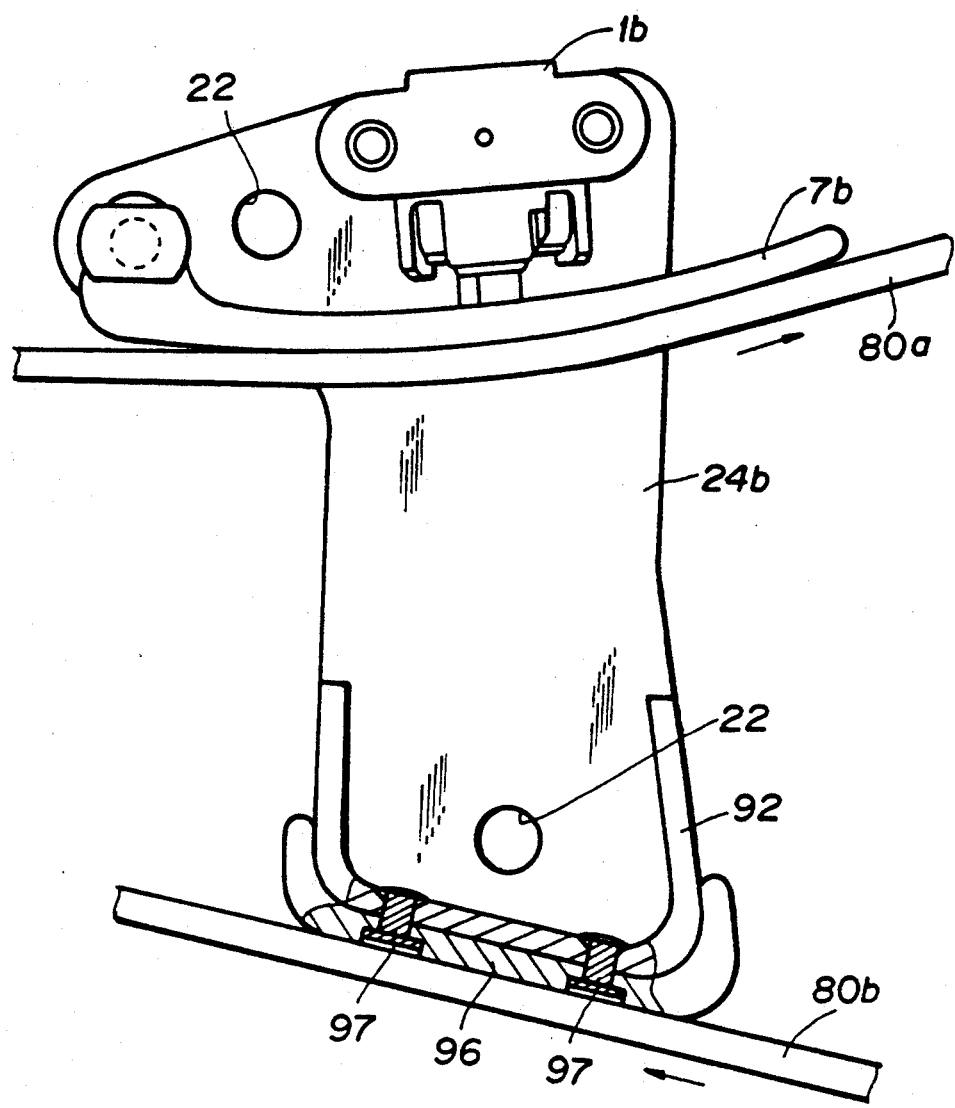
FIG. 12 shows a fourth embodiment used on a chain.

FIG. 12 shows a fourth embodiment comprising a tensioning unit 1b of three layered construction, a movable shoe 7b pivoted on a base plate 24b, and a stationary shoe 96 fixed by rivets 97 on a bent portion 92 of the base plate 24b. Both shoes may be made of the same material such as 6/6 nylon. In this case, the slack side 80a of a chain 80 is tensioned constantly by the movable shoe 7b, and at the same time, the vibration of the tight side 80b of chain 80 is stabilized by the stationary shoe 96 by mounting only the unit tensioner, thus dispensing with additional operations for mounting and adjusting separate components.

Figure 13:
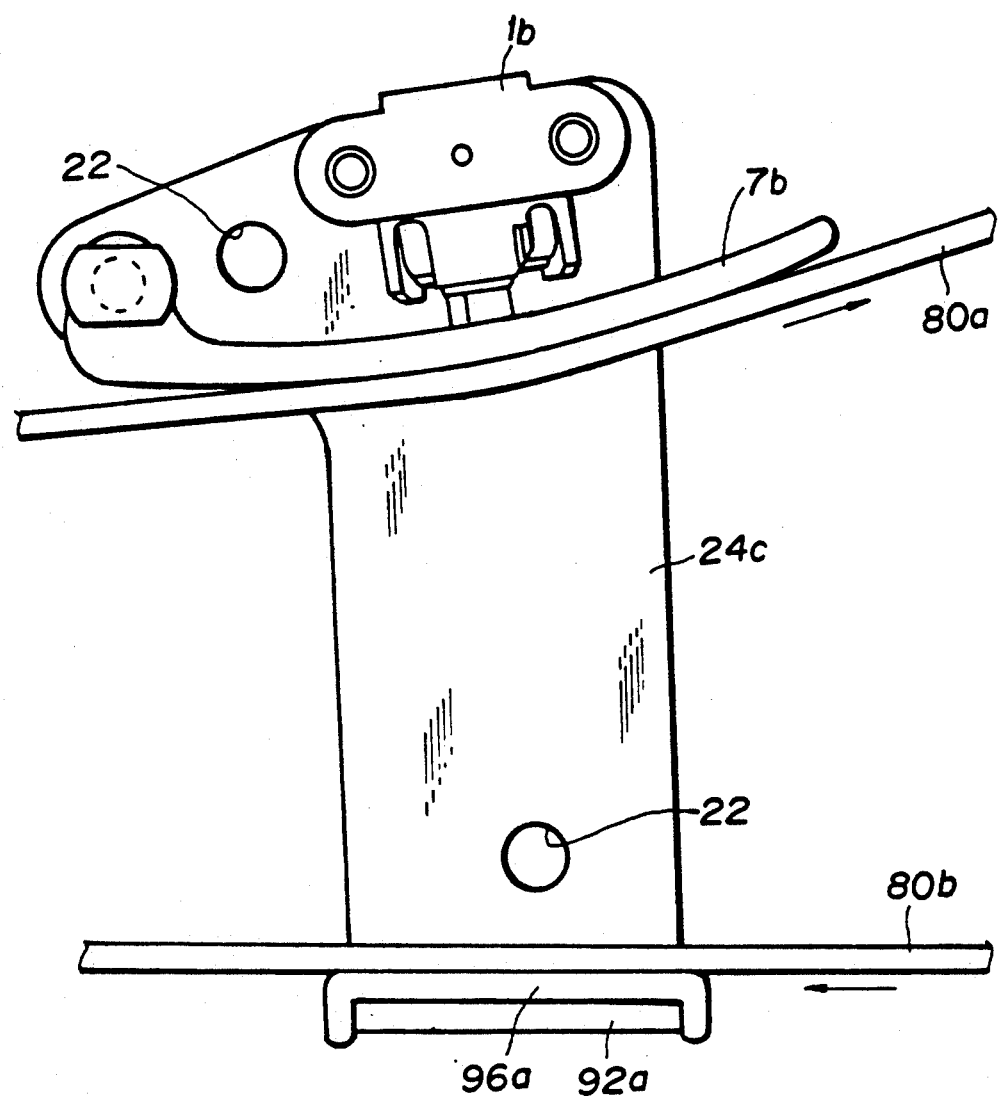
FIG. 13 shows a fifth embodiment used on a chain.

FIG. 13 shows a fifth embodiment comprising a tensioning unit 1b of three layered construction, a base plate 24c provided with a bent portion 92a supporting a stationary shoe 96a, and a long arched shoe 7b pivotally mounted on a base plate 24c. The slack side 80a of the chain is tensioned constantly by the movable shoe 7b, and at the same time, vibration of the tight side 80b of the chain is stabilized by the stationary shoe 96a by mounting only the unit tensioner, thus dispensing with additional operations required for mounting and adjusting separate components. In this case, both the movable and stationary shoes 7b and 96a abut the outside surfaces of the slack side 80a and the tight side 80b respectively.

Alternately, the fixed shoe 96a may be fixed on the plane portion of the base plate 24c eliminating the need for bent portion 92.

In conclusion, since the unit tensioner according to the present invention comprises the movable shoe pivoted on the base plate fastened on the casing or incorporrted with the tensioning unit, it is possible to keep a constant tension on a belt or chain by mounting only the unit tensioner on an engine. Then, such bothersome operations as designing, manufacturing, mounting and adjusting a separate base plate and a shoe or idler pulley as in conventional tensioners are dispensed with. Furthermore, maintenance work on the unitized system is much easier than in multi-attachment systems utilizing conventional tensioners and shoes or idler pulleys separately mounted to the engine.

What is claimed is:

1. A unit tensioner for tensioning a chain or belt comprising:

a tensioning unit wherein a rotational force of a rotatable cylinder within a casing energized by a torsion spring about the cylinder is converted into an axial urging force of an elongated tension rod supported by a non-circular slideway bearing fixed in the casing and engaged with said rotatable cylinder to extend a cap portion of the tension rod out of the casing to communicate for tensioning the chain;

support means for supporting elements of the unit tensioner and including a plate connected to the casing;

a movable shoe of arch form, of which an end is pivotally connected to a shoulder portion of said support means so that an inner, concave surface of said arch form shoe abuts on the cap portion and an opposite outer convex surface of the arch form shoe abuts a slackened portion of the chain so as to prevent wear of said cap portion and slackened portion of the chain during tensioning of the chain; and a stationary shoe fixed on said support means so as to stabilize a tight portion of the chain.

2. A unit tensioner for tensioning a chain or belt comprising:

a tensioning unit having a casing, a torsion spring within said casing and a tension rod extending from said casing, wherein a rotational force of a rotatable body biased by the torsion spring is converted into an urging force to the tension rod which is non-pivotably supported by a non-circular bearing fixed in the casing of the tensioning unit and is threadedly engaged with said rotatable body; and a movable shoe, one end of which is pivotably supported by the casing, and the other end, being a free end, is urged by the tension rod to provide tension to a slackened portion of the belt or chain.

3. A unit tensioner according to claim 2 further comprising a stationary show fixed on said casing, one end thereof being pivotably supported by said casing at a position opposite to the urging direction of said tension rod, the other end thereof being a free end, said stationary shoe being installed abutting a stationary cap secured to said casing for receiving and guiding a reaction force of a tensioned portion of said belt or chain.

* * * * *